(12) United States Patent
McCrink

(10) Patent No.: US 6,293,313 B1
(45) Date of Patent: *Sep. 25, 2001

(54) STAINLESS STEEL SHAFTS, ASSEMBLIES AND METHODS OF MAKING SAME

(76) Inventor: Edward J. McCrink, P.O. Box 1429, Rancho Santa Fe, CA (US) 92067

( * ) Notice: Subject to any disclaimer, the term of this patent is extended or adjusted under 35 U.S.C. 154(b) by 0 days.

This patent is subject to a terminal disclaimer.

(21) Appl. No.: 08/894,937
(22) PCT Filed: Jan. 2, 1996
(86) PCT No.: PCT/US96/00135
  § 371 Date: Sep. 3, 1997
  § 102(e) Date: Sep. 3, 1997
(87) PCT Pub. No.: WO96/27456
  PCT Pub. Date: Sep. 12, 1996
(51) Int. Cl.[7] .............. F16L 11/00; F16L 9/14; F16L 9/00
(52) U.S. Cl. .............. 138/172; 138/125; 138/142
(58) Field of Search .................. 138/172, 140, 138/125, 142, 138, 131, 139; 280/281.1; 174/106 R

(56) References Cited

U.S. PATENT DOCUMENTS

| 3,866,633 | * | 2/1975 | Taylor | 138/138 |
| 4,317,003 | * | 2/1982 | Gray | 174/106.2 R |
| 4,653,541 | * | 3/1987 | Oehlschlaeger et al. | 138/104 |
| 5,076,601 | * | 12/1991 | Duplessis | 280/281.1 |
| 5,080,385 | * | 1/1992 | Duplessis | 280/281.1 |
| 5,383,346 | * | 1/1995 | Laffler et al. | 72/51 |
| 5,485,948 | * | 1/1996 | McCrink | 138/131 |
| 5,520,223 | * | 5/1996 | Iorio et al. | 138/140 |
| 5,553,640 | * | 9/1996 | Ferenczy et al. | 138/142 |
| 5,655,572 | * | 8/1997 | Marena | 138/125 |
| 5,871,140 | * | 2/1999 | McCrink | 228/132 |

* cited by examiner

Primary Examiner—David A. Scherbel
Assistant Examiner—Davis Hwu
(74) Attorney, Agent, or Firm—Timothy J. King

(57) ABSTRACT

The invention provides methods of manufacturing hardened stainless steel tubing, pipe, shafts and assemblies. The present inventions also provides stainless steel shafts, tubing, pipe or assemblies reinforced with stainless steel members brazed and hardened within the shafts, tubing, pipe or assemblies.

10 Claims, 12 Drawing Sheets

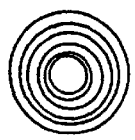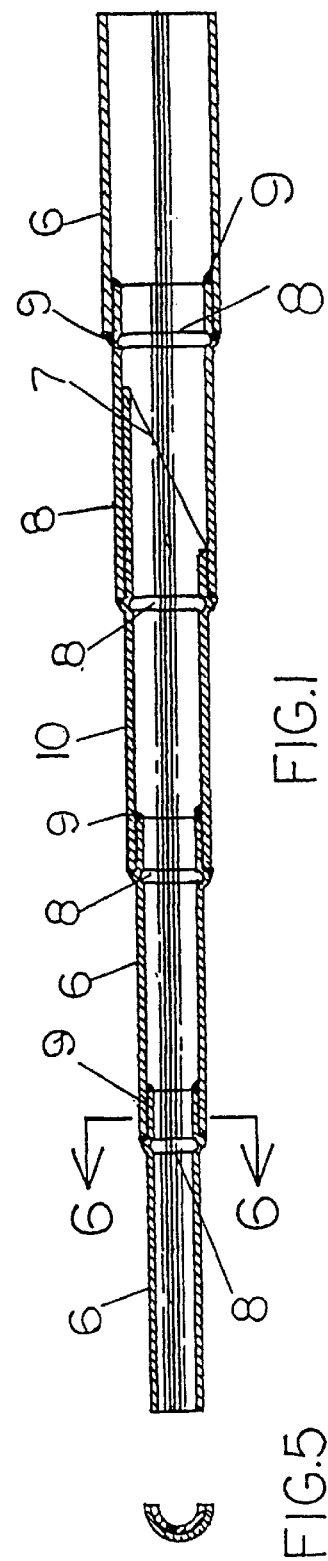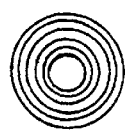

STAINLESS STEEL SHAFTS, ASSEMBLIES AND METHODS OF MAKING SAME

BACKGROUND OF THE INVENTION

The present invention is directed to hollow stainless steel shafts or tubing, assemblies and methods of making same. More particularly, the present invention is directed to brazed, air hardenable stainless steel tubular shafts. In addition, the present invention is directed to reinforced stainless steel tubular shafts, the reinforcement member being brazed inside the tubular shaft. The present invention is also directed to producing unitary assemblies of air hardenable stainless steel tubing which may be reinforced at pre-selected locations.

The shafts or tubing of the present invention are brazed in a controlled atmosphere furnace. Brazing in a controlled atmosphere furnace allows for the hardening and brazing of air hardenable stainless steel in the same brazing temperature cycle. The shafts produced by this process are light, flexible and strong. In addition, the process of the present invention allows for the reinforcement of air hardenable hollow stainless steel shafts with stainless steel inserts of any pre-selected dimension. The inserts are brazed inside the hollow shafts, thereby providing tubular shafts with reinforcement at precise locations.

Hollow metallic shafts are ubiquitous in our society. They are used in products where lightness and strength are required. Products which require hollow shafts include esoteric goods, such as sporting goods, and utilitarian ones e.g. airplane fuselage supports, cantilever street light poles, ladders, furniture, tools, etc. With respect to sporting goods, hollow shafts are used for golf clubs, bicycle frames, ski poles, fishing poles and the vertical supporting members of volleyball nets. In addition to lightness and strength, hollow shafts used in sporting goods sometimes require precise flexibility. Golf clubs and bicycle frames also require torque resistance.

Materials presently used to construct hollow metallic shafts include aluminum, low and high carbon steels, coated steels, alloy steels and composites. These materials may be objectionable for numerous reasons, including, but not limited to, weight, weakness, rigidity, flexibility, torque resistance and price. A hollow shaft which is light, strong, flexible and inexpensive is needed.

With respect to hollow shafts presently used in sporting goods, these shafts comprise fiberglass, kevlar, metals, graphite and composites. While fiberglass, composite and graphite shafts are light and strong, their flexibility can be limited. This characteristic results in their snapping under loads in which a metal shaft would not. As for hollow metallic shafts, aluminum is light, but lacks the strength of steel. Titanium and formerly classified metals generally have very favorable characteristics, but are in limited supply and are therefore very expensive. Carbon steels are strong but oxidize easily. Prior art carbon and alloy steel tubular shafts are often inadequate because of their weight and their tendency to corrode.

In addition to the difficulties of weight and corrosion, welding, the joining technique of choice for metallic hollow shafts, weakens practically all metals adjacent the weld. Even the welding of austenitic stainless steel introduces impurities into the grain boundaries which often result in oxidation and failure of the weld. Since corrosion resistance, as well as lightness, strength and flexibility, is a desirable characteristic for hollow shafts, graphite and composites have become the materials of choice.

Despite the limitations of stainless steel to provide a completely corrosion resistant hollow shaft, it has been, and still is, used to manufacture hollow shafts. Austenitic stainless, as opposed to ferritic and martensitic, is the most widely used type of stainless steel for producing tubular shafts. Austenitic stainless is non-magnetic and is not air hardenable. Of the stainless steels, only martensitic is air hardenable.

In addition to austenitic, that is, 300 series, stainless steel's limitations vis-a-vis corrosion resistance, stainless steel cannot presently be fashioned to provide strength where needed at a competitive cost utilizing prior art methods. Austenitic steel can be drawn so it is butted and thereby provide reinforcement, however drawing requires a significant amount of labor, thereby increasing the cost. In addition, excessive drawing will introduce impurities into the grain boundaries of austenitic stainless steel.

BACKGROUND ART

The prior art suggests numerous, but unsatisfactory, methods for producing and/or reinforcing hollow metallic shafts. U.S. Pat. No. 1,944,069 describes a tubular metallic shaft closely simulating the wooden shaft used on a golf club reinforced within the tube by a convoluted material having reentrant portions extending longitudinally therefrom and separated by longitudinal ribs. U.S. Pat. No. 1,950,342 describes a hollow tubing metallic "steel" shaft with a core of sponge rubber. U.S. Pat. No. 3,762,707 describes the use of a material of a predetermined flexibility to a shaft which is used for a golf club. In addition, the interior of the shaft is partially filled from the point of attachment to the golf club head with a flexible plastic material. This plastic material is present within the tube from the point of attachment to a predetermined point.

Another unsatisfactory means of reinforcing hollow shafts is taught by U.S. Pat. No. 908,127 entitled Reinforcement for Metallic Tubing. This patent teaches tack brazing angle iron inside hollow shafts. This method provides shafts which are extremely heavy with reinforcement which has limited attachments to the hollow shaft it is reinforcing. Such an invention has no uses with the present demand for light, strong shafts demanded by present applications for hollow shafts.

The present invention provides an improved hollow shaft which can be reinforced in preselected locations. More particularly, the present invention solves the problems of the prior art by providing an air hardenable stainless steel tubing which can be reinforced or attached to other stainless steel tubing or steel without weakening the tubing or introducing impurities.

SUMMARY OF THE INVENTION

The present invention provides reinforced and hardened stainless steel tubing and methods for producing such tubing from an assembly of stainless steel tubing or pipe, a stainless steel reinforcement member and a brazing material. The method comprises introducing within the tubing a stainless reinforcement member, at least a portion of which contacts the internal surface of the tubing; contacting at least one confluence of the tubing and the member with a brazing material; introducing the assembly into a controlled atmosphere furnace; and brazing and hardening the assembly to form hardened and reinforced stainless steel tubing.

The present invention also provides a stainless steel tubular shaft, and methods of making same, made from air hardening stainless steel reinforced by a coil of stainless steel wire, said coil forming a tight fit between the outside diameter of the coil and the internal diameter of the shaft; and brazing material proximal to the loci of intersections of the coil with the tubular shaft.

The present invention also provides hardened stainless steel tubing and methods for producing such tubing from air hardenable stainless steel sheet and a brazing material, the method comprising selecting an annealed sheet of air hardenable stainless steel capable of being formed into tubing, the sheet characterized by a leading edge, two joining edges, a following edge, a top and a bottom; folding a portion of each of the joining edges; rolling the sheet in such a manner that it becomes tube-shaped; arranging the folded portions of the joining edges to form a seam; contacting the brazing material with a portion of the seam; introducing the assembly into a controlled atmosphere furnace; and brazing and hardening the assembly sufficiently to form hardened stainless steel tubing.

The present invention further provides methods for producing a unitary structural frame from an assembly of air hardened stainless steel components comprising fitting the components together, contacting joints to be brazed with a brazing material, placing the assembly in a controlled atmosphere furnace, brazing the components and hardening the air hardenable stainless steel components.

The present invention further provides hardened hollow stainless steel shafts and methods of making such shafts from stainless steel tubing segments and a brazing material comprising: selecting a plurality of stainless steel tubing segments, at least one of which consists of air hardenable stainless steel; overlapping the ends of the segments in a such a manner that joints are formed; introducing the brazing material proximate to the segment joints; introducing the shaft assembly into a controlled atmosphere furnace; and brazing and hardening the assembly to form a rigid shaft.

BRIEF DESCRIPTION OF THE DRAWINGS

FIG. 1 provides a plan view of a brazed shaft which is tapered.

FIG. 2 provides a side view of the brazed shaft of FIG. 1.

FIG. 3 provides a left end view of the brazed shaft of FIG. 1.

FIG. 4 provides a right end view of the brazed shaft of FIG. 1.

FIG. 5 provides sectional view through 6—6 of FIG. 1.

DETAILED DESCRIPTION OF THE INVENTION

Figure 6:
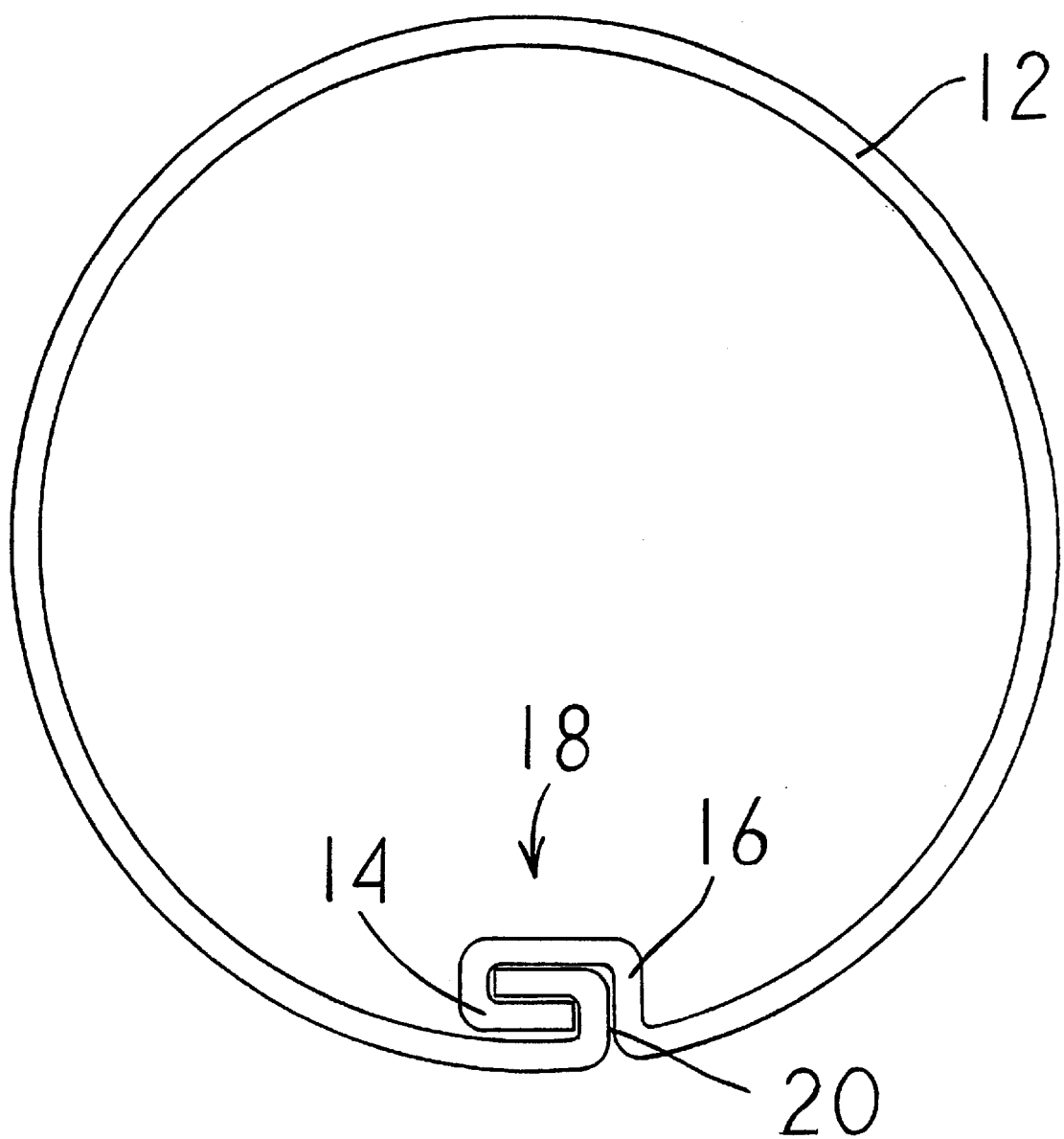
FIG. 6 provides an end view of stainless steel tubing with a brazed lock seam.

The present invention provides a method of manufacturing hollow air hardenable stainless steel shafts, tubing and pipe. The present invention further provides the reinforcement of such shafts, tubing or pipe. One embodiment of the present invention is directed to the method of manufacturing shafts in which the weight, shaft flex, torque, bend point and strength are precisely tailored. Use of such a precisely tailored shaft is for a golf dub or bicycle frame.

For use with a golf club, the precisely tailored shaft may be assembled from a plurality of tubular segments having one end that is tapered, and the segments having decreasing diameters so as to provide a segmented shaft of decreased diameter from the golf club handle to the club head attachment point. This particular embodiment could be produced from straight segments, tapered segments or a combination of both. The assembled shaft would have at least one segment that was made from an air hardenable stainless steel, such as 410 stainless steel.

In a preferred embodiment, the tubular segments are annealed prior to hardening. For purposes of this invention, "air hardenable" will mean heat treating to a proper temperature and cooling in a protective, non-oxidative atmosphere as opposed to hardening with a liquid quench. A liquid quench thermally shocks the workpiece and produces a deformity. Because of the quench-induced thermal shock, a straightening step is required. Stainless steel hardened by the method of the present invention is not deformed by the hardening step so no straightening step is usually needed.

In a preferred embodiment of the present invention, the workpiece is introduced into an ambient temperature chamber with a non-oxidative atmosphere for cooling. In some embodiments, the ambient temperature chamber will be water-jacketed. With respect to the non-oxidative atmosphere, inert gas, hydrogen gas and vacuum environments are contemplated.

The present invention may be produced from martensitic stainless steel other than 410 stainless steel, e.g. 420, 431 or 440 stainless steel. It may also be appropriate to use a combination of martensitic steels where the particular application warrants. The present invention can be produced from both strip stock and sheet, annealed or not, depending upon the desired diameter of the tubing and the shape of the reinforcement member. The reinforcement member of the present invention is used to reinforce the stainless steel tubing, pipe and shafts. These reinforcement members may be made from air hardenable stainless steel or from an austenitic stainless steel if ductility is desired.

The reinforcement member can comprise many shapes or forms. The reinforcement member can be a bushing, which when fitted into the tube forms an interference fit with the tubing. The reinforcement member can also be a split bushing, an adaptation useful if working with seamed tubing, such seamed tubing being known to those of ordinary skill in the art. One seamed tubing of interest is lock seam tubing. The bushing can have a perpendicular cut at its end or can be biased. Other non-conventional shapes, such as diamond or oval shapes can be contoured to form an interference fit with the internal surface of the tubing prior to brazing.

With respect to different forms, the reinforcement member may be a wire of any geometric profile. The wire may be in the form of a coiled helix. Such a coiled helix may have a single or variable pitch. For example, a very tight pitch (a small amount of space between each coil) would be desirable where strength is needed while a loose pitch would be beneficial where less strength is needed. Use of such a variable-pitched coil would allow one to precisely locate the reinforcement along an entire length of a shaft.

With respect to the segmented shaft described above, a reinforcement member can be used if additional reinforcement is needed. The reinforcement member would be inserted into the shaft prior to the segments, whether straight or tapered, are fitted together. A brazing material, for example copper, would be applied proximate to the segment joints 9.

As part of the assembly, a brazing material is introduced at each of the segment joints. Preferably copper is used, but other brazing materials such as brass and silver alloy combinations are contemplated. An improvement of the present invention is that no flux is needed. Once melted, the brazing material will act under capillary action, thereby joining all surfaces which are in near or actual contact. After assembly, the shaft is introduced into a controlled atmosphere furnace. The assembly is heated in the controlled atmosphere furnace. For purposes of this application, "controlled atmosphere furnace" means a furnace with an atmosphere which prevents oxidation, e.g. hydrogen, is provided. Such an atmosphere can include a vacuum. In one embodiment, a hydrogen atmosphere is fed into a hump furnace. The assembly is heated to the proper temperature, whereby the assembly is brazed and hardened. In a preferred embodiment the assembly is brazed and hardened in the same brazing temperature cycle. The temperature range appropriate for brazing and hardening air hardenable stainless in the same brazing temperature cycle steel is 1850–2000° F. While at such a temperature, the time in which the piece to be hardened and brazed has to remain in the furnace depends upon the type of furnace, the wattage of the furnace and the thickness of the material to be brazed and hardened. A hump furnace is the furnace of choice to produce the present invention. This type of furnace is a continuous mode type. Both batch mode or continuous modes are contemplated for producing the present invention, although the continuous mode is preferred. The time period for producing the present invention in a continuous mode is two and a half to fifteen minutes in the heating section of the furnace. The workpiece is then allowed to cool, at which time the martensitic stainless steel will harden. Preferably, the cooling occurs in a water-jacketed cooling chamber which contains a non-oxidizing atmosphere.

The tubular segments can be varied in shape from straight portions with flat ends to elongated, narrow portions or pointed, bias cut, portions. The thickness of the segments may be as thin as 0.005 inches.

The method of the present invention provides for brazing the stainless steel segments or other type of hollow shafts in a controlled atmosphere furnace. Brazing in this manner eliminates the need of a brazing flux, provides a strong joint and allows for the precise location of reinforcement of shafts without the labor required in prior art methods.

The present invention provides in one embodiment hollow shafts composed of segments of air hardenable stainless steel, the use of such segments allowing for the selection of the appropriate thickness and length of each particular segment. The shaft's strength is maximized by overlapping segments where strength is needed. The segments are selected where strength is not as critical, thereby lessening the weight of the shaft. The shaft segments may be tapered or straight, or have different diameters, to provide the suitable strength and weight needed for the application.

In an another embodiment of the present invention the segments are cleaned prior to assembly. Methods for cleaning include vapor degreasing or some equivalent method. The segments are then assembled to produce a shaft of predetermined length. The brazing material is then introduced into the assembled shaft. The assembly is then placed in a controlled atmosphere furnace with an internal temperature of 1850–2000° F., a temperature suitable for brazing and hardening the shaft assembly in the same brazing temperature cycle. The shaft would then be cooled in an integral part of the furnace which would also have the atmospheric environment designed to deter oxidation. With respect to placement of the brazing material, it should be placed at the segment joints 9 of the pre-brazed shaft.

The present invention also provides a method for producing hardened stainless steel tubing from an assembly of an air hardenable stainless steel sheet or strip stock and a brazing material, the method comprising selecting a hardenable stainless steel sheet capable of being transformed into tubing, the sheet characterized by a leading edge, two joining edges, a following edge, a top and a bottom; folding a portion of each of the joining edges; rolling the sheet in such a manner that it becomes tube-shaped; arranging the folded portions of the joining edges to form a seam; contacting the brazing material with the seam; introducing the assembly into a controlled atmosphere furnace; and brazing and hardening the assembly to form hardened stainless steel tubing.

In a preferred embodiment, the method further comprises heating the furnace to a temperature suitable for brazing and hardening the assembly in the same temperature cycle. The present invention further provides hardened stainless steel tubing comprising a brazed seam; the tubing produced by the method set forth herein above. In a preferred embodiment, the seam is a lock seam. In another preferred embodiment, as provided in FIG. 18, the seam is a channel seam. Channel seam tubing is formed tubing with turned down ends, the channel serving as a guide for inserting reinforcements into the tubing prior to brazing.

The present invention further provides a method for producing reinforced and hardened stainless steel tubing from an assembly of stainless steel tubing, a reinforcement member and a brazing material, the method comprising selecting an air hardenable stainless steel tubing of a predetermined diameter; introducing within the tubing a reinforcement member, at least a portion of an outer surface of the reinforcement member in contact with the internal surface of the tubing; contacting at least one confluence of the tubing and the member with a brazing material; introducing the assembly into a controlled atmosphere furnace; and brazing and hardening the assembly to form hardened and reinforced stainless steel tubing. Preferably, the tubing is tempered after the brazing and hardening of the shaft. In a preferred embodiment, the tubing is annealed prior to assembling the present invention.

In a preferred embodiment, the reinforcement member is configured so a substantial potion of one of its outer surfaces contacts the inner surface of the tubing. As the reinforcement members anticipated for use with the present invention run parallel to the tubing in which they are inserted, it is a further preferred embodiment that a surface of the reinforcement member contacts the tubing along the reinforcement member's entire length. The reinforcement member may be as long as the tubing it is inserted into but there are applications where it is advantageous that the member reinforces only a portion of the tubing.

In a preferred embodiment, the reinforcement member is made of a non-air hardenable stainless steel. Preferably, this reinforcement member is made of a non-air hardenable which anneals in the temperature range in which air hardenable stainless steel hardens. By having an annealed, more ductile reinforcement member, the reinforcement member can retard the shattering of the hardened tubing it reinforces. This safety aspect may be desirable in bicycle frames produced by the present invention, or other structural supports produced by the present invention which may be subject to strains or shocks.

In a preferred embodiment the method further comprises heating the furnace to a temperature suitable for brazing and hardening the assembly in the same brazing temperature cycle. In a further preferred embodiment of the invention, the stainless steel tubing used to make the reinforced and hardened tubing comprises a lock seam. In a preferred embodiment of the invention the method further comprises contacting the lock seam with a brazing material prior to introducing the assembly into the controlled atmosphere furnace. In an additional embodiment of the invention, the reinforcement member utilized in the method is a bushing. It is contemplated that the bushing will have an interference fit with the tubing in which it is placed.

In a further embodiment of the invention, the metal bushing is further characterized by having a portion thereof cut away, that is, it would be a split bushing. The reinforcement member may be composed of any metal, but in a preferred embodiment it is comprised of an air hardenable stainless steel. In a further embodiment of the invention, the reinforcement member comprises an austenitic stainless steel so as to provide ductility to the reinforced and hardened stainless steel tubing. In a preferred embodiment of the present invention, the split bushing will have lightening holes punched, cut, laser cut or drilled therein prior to being inserted into the tubing. Preferably, this embodiment of the present invention is fabricated from stainless steel sheet, is perforated, is shaped into the split bushing, and is then inserted into the tubing member to be reinforced.

In a further embodiment of the present invention, the metal bushing is cut on a bias so as to provide reinforcement but with less weight. In another embodiment of the present invention the reinforcement member has an oblong, elliptical or diamond shape. The present invention further provides reinforced and hardened stainless steel tubing comprising a first hardened stainless steel tube; and a reinforcement member, a surface of the member brazed to the first stainless steel tube to strengthen it; the tubing produced by the method set forth herein above.

The present invention provides a method for producing a unitary structural frame from separate components, both interior and exterior, comprising selecting air hardenable stainless steel tubing components, pre-assembling the frame from the components; contacting adjoining components with a brazing material; placing the assembly in a controlled atmosphere furnace at a temperature range suitable for brazing; and brazing and hardening the components.

In a preferred embodiment, the temperature range is suitable for brazing the components and hardening the air hardenable stainless steel components in the same brazing temperature cycle. For purposes of this invention, the "same brazing temperature cycle" means a single heating and cooling cycle. In other words, the temperature is raised to a temperature suitable to braze but also to harden the air hardenable stainless steel as it cools. This temperature range is 1850–2000° F. In another preferred embodiment, the frame utilizes an air hardenable stainless steel reinforcement member in the frame assembly.

The present invention further provides a unitary structural frame produced by this method, where such frames may form a portion of an automobile frame, an airplane or a bicycle frame. In a preferred embodiment it forms an entire bicycle frame.

The method for producing the unitary structural frame would preferably include degreasing all the components which are made of air hardenable stainless steel and degreasing those components, if any, which are non air hardenable. Preferably, all the components of the frame are made from air hardenable stainless steel.

The components would then be fitted together. Preferably, the components would be press fitted. Preferably, the internal components, including reinforcement components, are press fitted, followed by the press fitting of external components. In a preferred embodiment, stainless steel tube assemblies, e.g. for a bicycle frame, are inserted into air hardenable stainless steel lugs. The brazing material may be applied adjacent to the joints to be brazed in the form of wire, paste, or by pre-copper plating the components.

Preferably, the preassembled frames are placed in a continuous, hump-type hydrogen atmosphere furnace. In such a furnace, the frame would be automatically conveyed to the heating zone of the furnace. The temperature of the furnace would preferably be 2000° F. At this temperature copper will melt and flow by capillary action to completely braze all the contacted joint areas. This method will create a metallurgically joined, one piece assembly. Preferably this method is used to produce a bicycle frame but may be adapted to produce other types of structural frames.

As the brazed frame assembly automatically leaves the heating zone of the furnace and enters the water-jacketed cooling section, the assembly cools and the air hardenable stainless steel hardens automatically. The temperature range for hardening is 1850–2000° F. The brazed and hardened frames exit the furnace cooling chamber shining brightly because of the oxide-free protective atmosphere.

This preferred method of manufacturing a structural frame will provide very high quality features, that is, high strength, light weight and corrosion resistance in addition to providing sealed air chambers. With respect to the production of a bicycle frame, the sealed air chambers may serve as compressed air chambers. Such air chambers would replace the need for an air pump, thereby further reducing added weight and cost. The present invention could produce several hundred bicycle frames per hour per furnace. This would supply substantial economic gains over existing methods.

This method would apply to numerous applications, products and assemblies where a high strength to weight ratio is needed: racing automobile frames, aircraft frames, battery operated automobiles and golf carts, ladders, street lamps and other support structures.

Referring to FIG. 1, the sectional view of a hollow tapered shaft, it show telescoping segments 6 brazed at their joining surfaces (joints) at 9. Segment 10 is made from 0.010 inch stainless steel with a bias end 7. Segments may have a circumferential ring 8 to ensure proper location of the segments when assembled, yet this is not an essential element of the invention. Segments need not be telescoping.

The thickness of the segments and the amount and shape of overlap provide tailoring of the completed shaft for strength, flexibility and stiffness, which may be accomplished by a variety of ways. First, the thickness of individual segments may be varied. Indeed, the segment material may be as thin as 0.005 inches. Second, the amount of overlap of adjacent segments may be varied to provide additional strength where needed. A further embodiment of tailoring the shaft is tapering the overlap of the adjacent segments, as set forth in 7 of FIG. 1. A further embodiment of tailoring the completed shaft is altering the shape of overlap, e.g., semi-elliptical, rhombic or semicircular, to distribute the stresses on the particular joint. Non-uniform segment shapes are also contemplated by the invention.

Referring to FIG. 6, the end view of the hollow metal tubing, it provides the tubing wall 12, the joining edges 14 and 16 folded so as to form a lock seam 18. In between the folded edges 14 and 16 is the solidified brazing material 20. The joining edges may be folded in a variety of ways to form the lock seam, and such ways are known to those of skill in the art.

Figure 7:
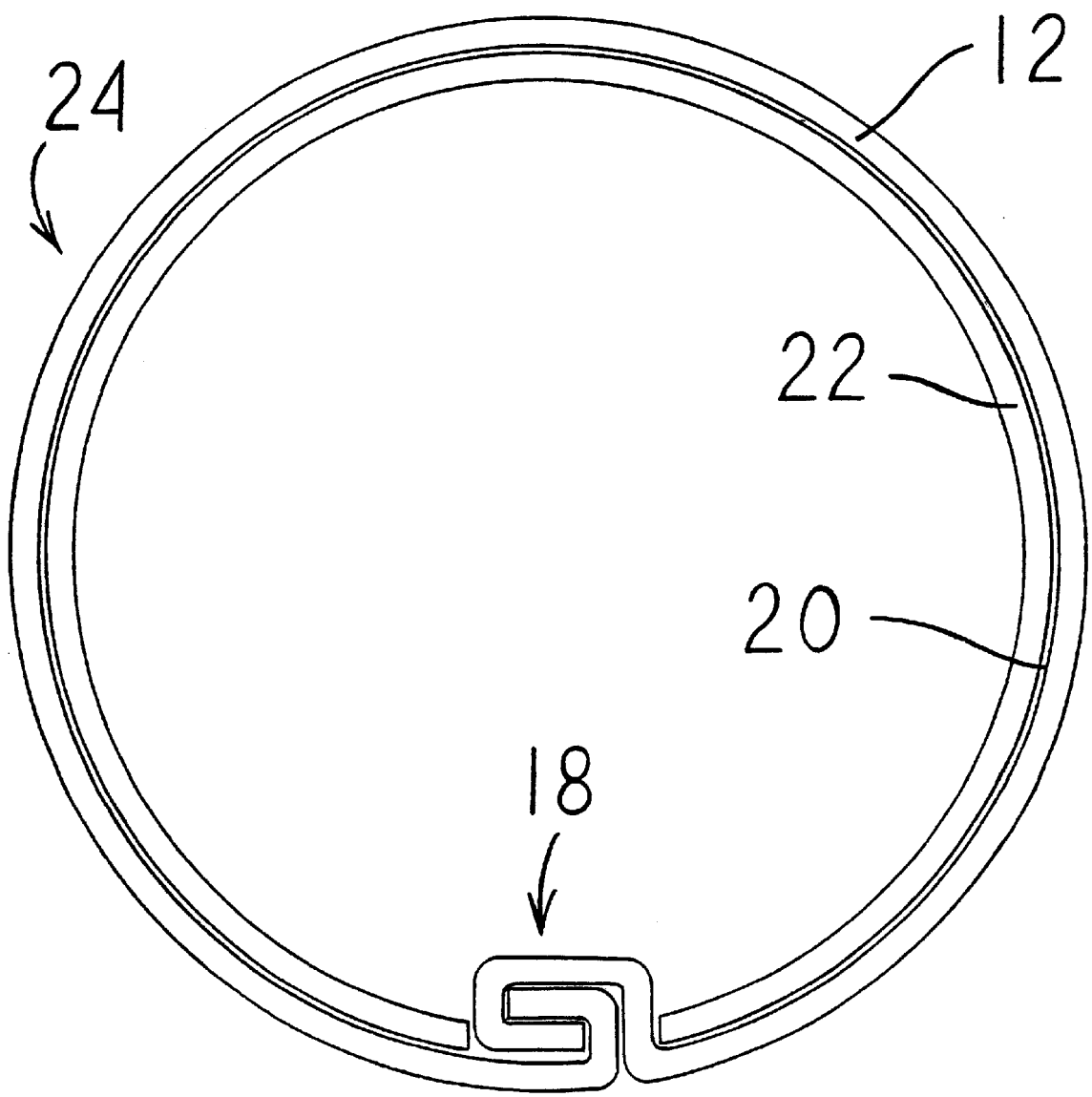
FIG. 7 provides an end view of a stainless steel tubing segment with a brazed lock seam and split bushing.

Referring to FIG. 7, the end view of the reinforced hollow metal tubing provides the tubing wall 12, the joining edges 14 and 16 folded so as to form a lock seam 18. In between the folded edges 14 and 16 is the solidified brazing material 20. FIG. 7 further provides a split bushing 22 which is brazed to the tubing 24. Where the hardenable stainless steel tubing utilized to produce the present invention does not have a brazed lock seam, a conventional bushing may be used, unless the particular application requires strength on only one side of the tube. In such a circumstance, it's appropriate to introduce a split bushing, strip, or rods, e.g., which would be brazed into the tubing. Moreover, as with the tapered shaft, pre-designed inserts of a variety of shapes is contemplated for the present invention, said reinforcement members fashioned according to the specific strength and weight characteristics desired for the particular application.

Figure 8:
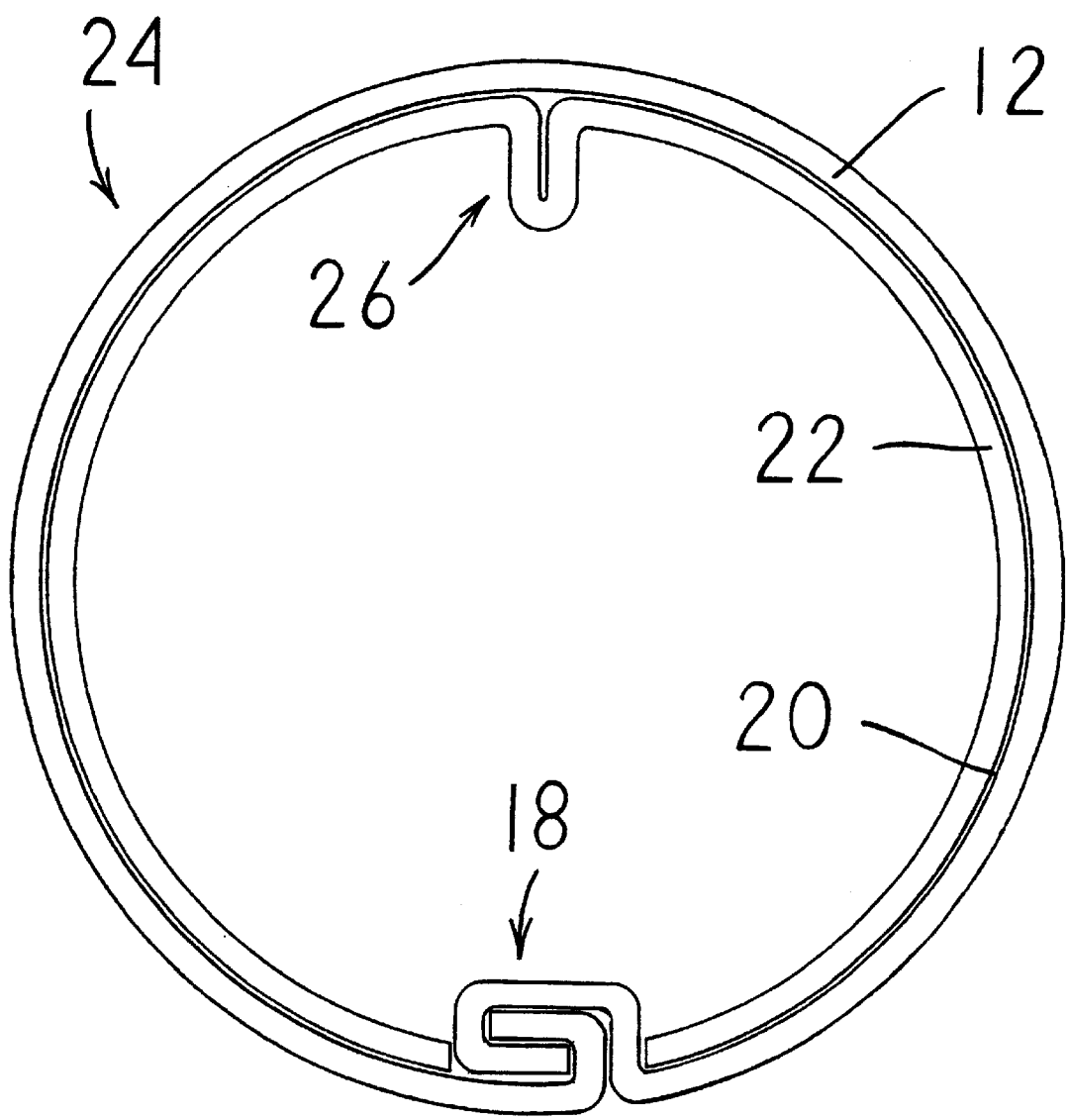
FIG. 8 provides an end view of a stainless steel tubing segment with brazed lock seam and a split bushing with a rib diametrically opposed to the bushing aperture.

FIG. 8 also provides a split bushing 22 brazed inside a brazed lock seam tubing. However, this split bushing also contains a rib 26 for providing additional strength.

Figure 9:
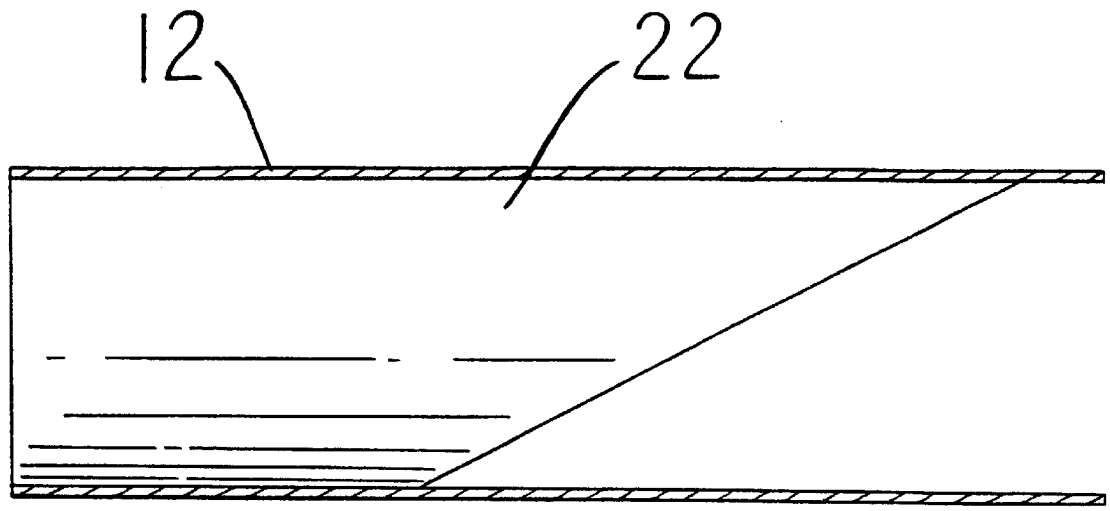
FIG. 9 provides a transparent plan view of a stainless steel tubing segment with a brazed bushing, the bushing having a biased cut.
Figure 10:
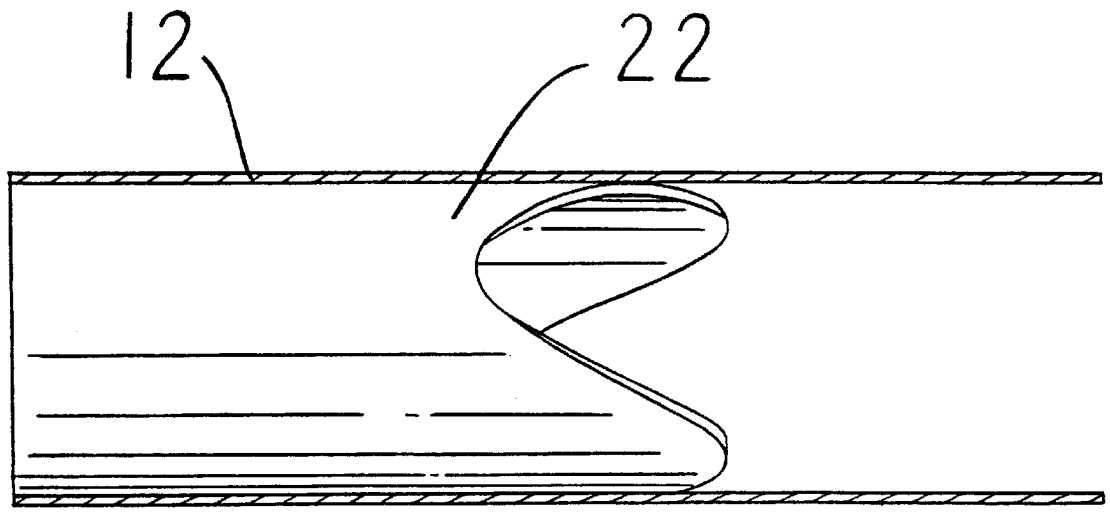
FIG. 10 provides a transparent plan view of a stainless steel tubing segment with a brazed bushing, the bushing having a biased cut different than that set forth in FIG. 9.

FIGS. 9 and 10 provide two differently shaped split bushings 22. Both are cut on a bias so as to provide strength where needed in the tube. Such an embodiment would eliminate the need to use butted shafts, which are very expensive. In addition to the shapes provided in FIGS. 9 and 10, it is contemplated that other shapes, diamond, rhombic, elliptical, etc., could be used in fashioning the reinforcement member.

Figure 11:
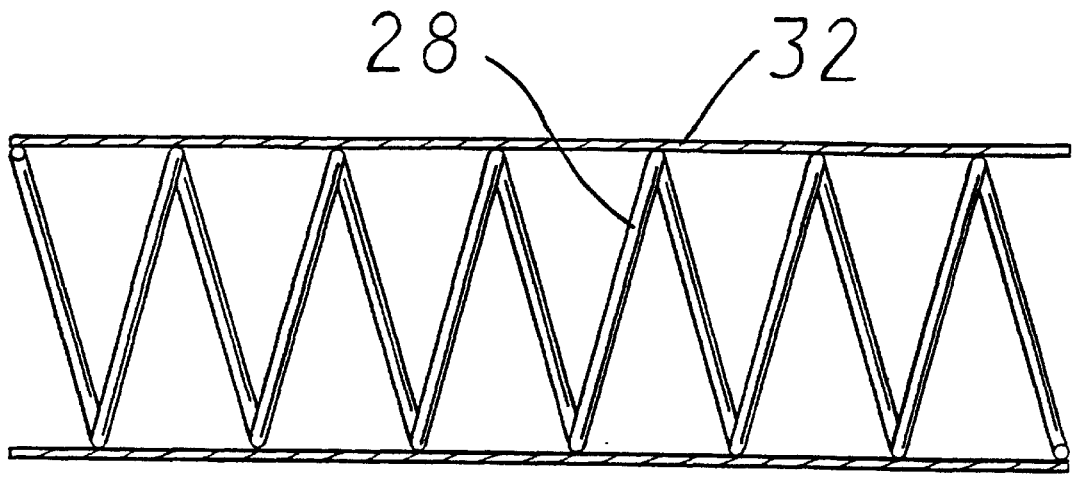
FIG. 11 provides a transparent plan view of a shaft reinforced with a coiled helix.
Figure 12:
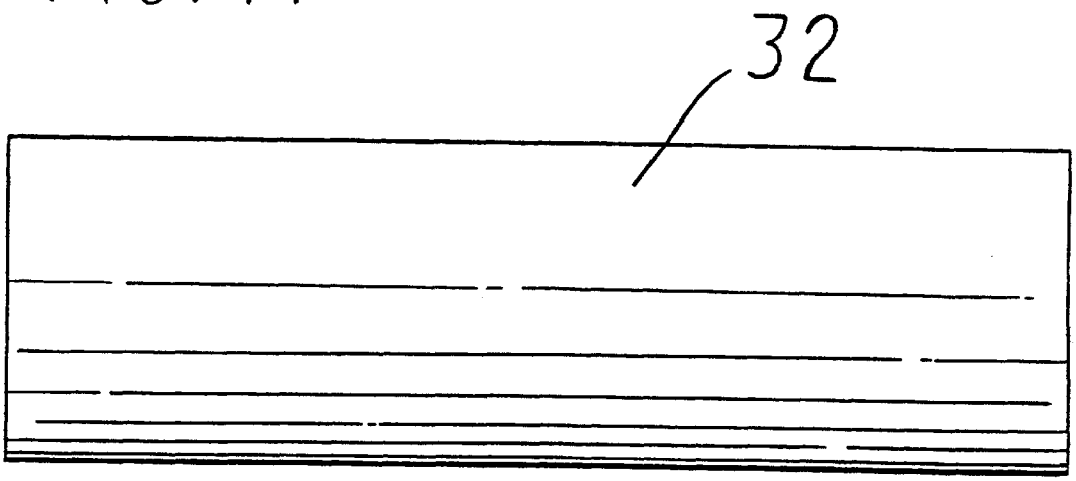
FIG. 12 provides a side view of the shaft of FIG. 11.
Figure 13:
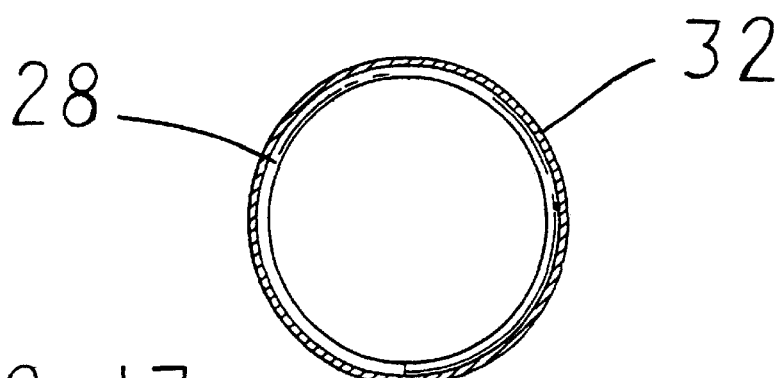
FIG. 13 provides a left end view of FIG. 12.

FIG. 11 illustrates a reinforced shaft wherein the inserted wire helix 28 has an interference fit with the inside surface of the metallic shaft 32. FIG. 13 is a left end view of FIG. 11.

Figure 14:
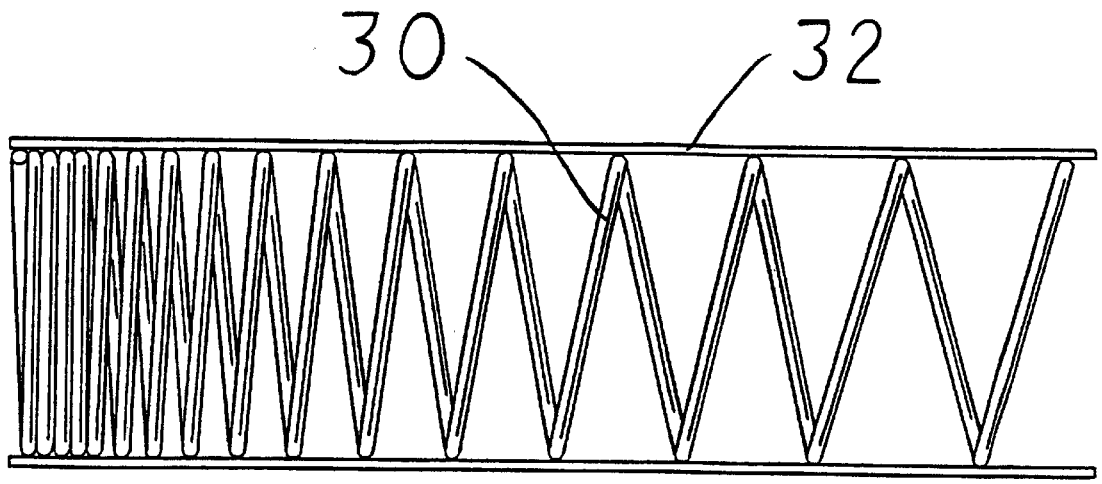
FIG. 14 provides a transparent plan view of a shaft reinforced with a coiled helix with a variable pitch.
Figure 15:
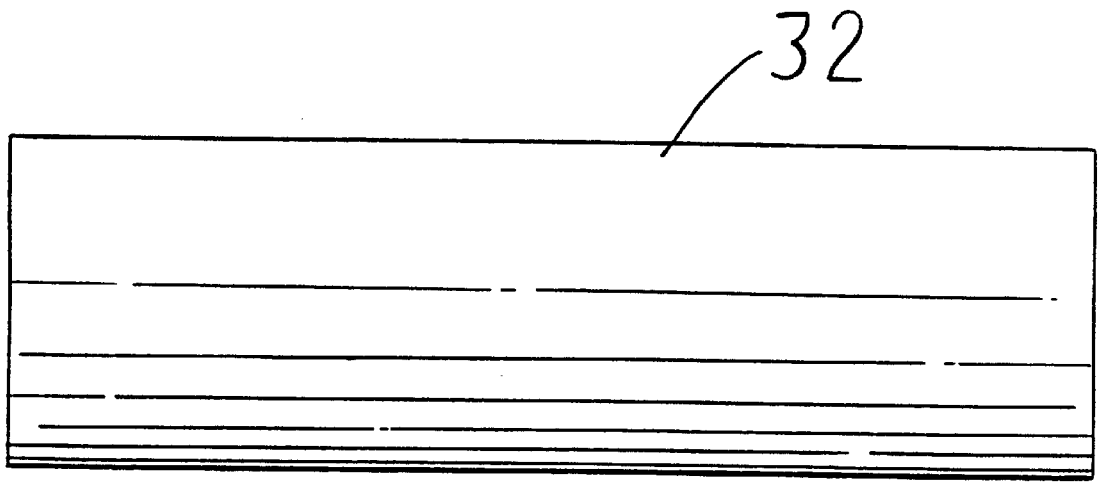
FIG. 15 provides a side view of the shaft of FIG. 14.
Figure 16:
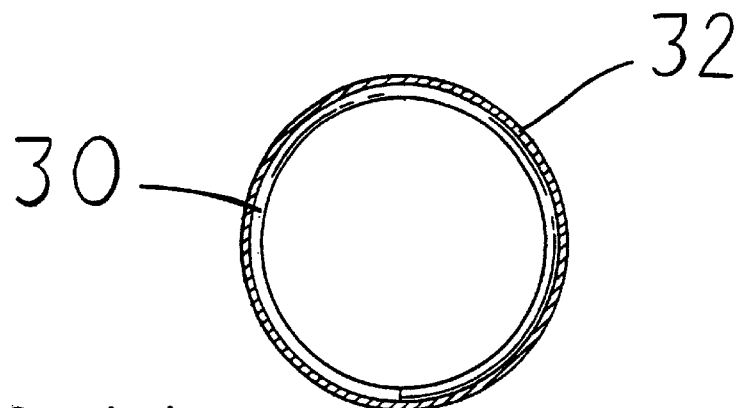
FIG. 16 provides a left end view of FIG. 15.

FIG. 14 illustrates a reinforced shaft wherein the variable pitch wire helix 30 has an interference fit with the inside surface of the metallic shaft 32. FIG. 16 is a left end view of FIG. 14. For the specific modification of the invention as applied to a golf club, the shaft is fabricated from air hardening 410 stainless steel and the reinforcing wire is also made from 410 stainless steel or the equivalent. The gauges of stainless steel used in the reinforcing wire and the shaft are selected to provide a desired strength and flexibility of the finished golf club.

Figure 17:
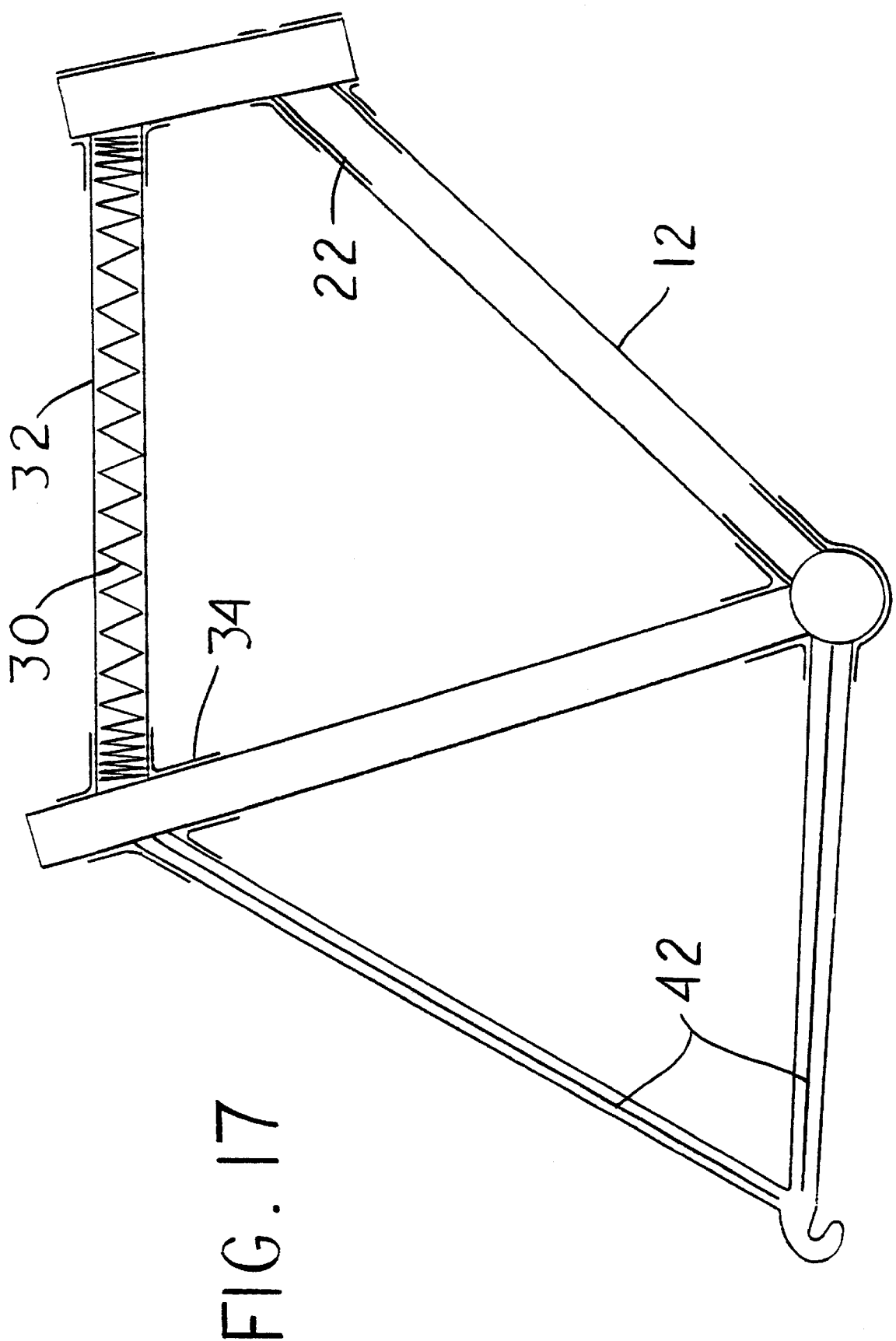
FIG. 17 provides a stainless steel bicycle frame reinforced with a variety of reinforcement members.

FIG. 17 illustrates a stainless steel bicycle frame produced by the methods set forth herein. The top tube 32 is reinforced with a variable-pitch coiled wire 30. The top tube fits into the lug 34 which also reinforces the bicycle at that location. The down tube 12 provides a bushing 22 which provides additional reinforcement. FIG. 17 further provides a chain stay and a seat stay produced out of channel seam tubing reinforced with wire 42.

Figure 18:
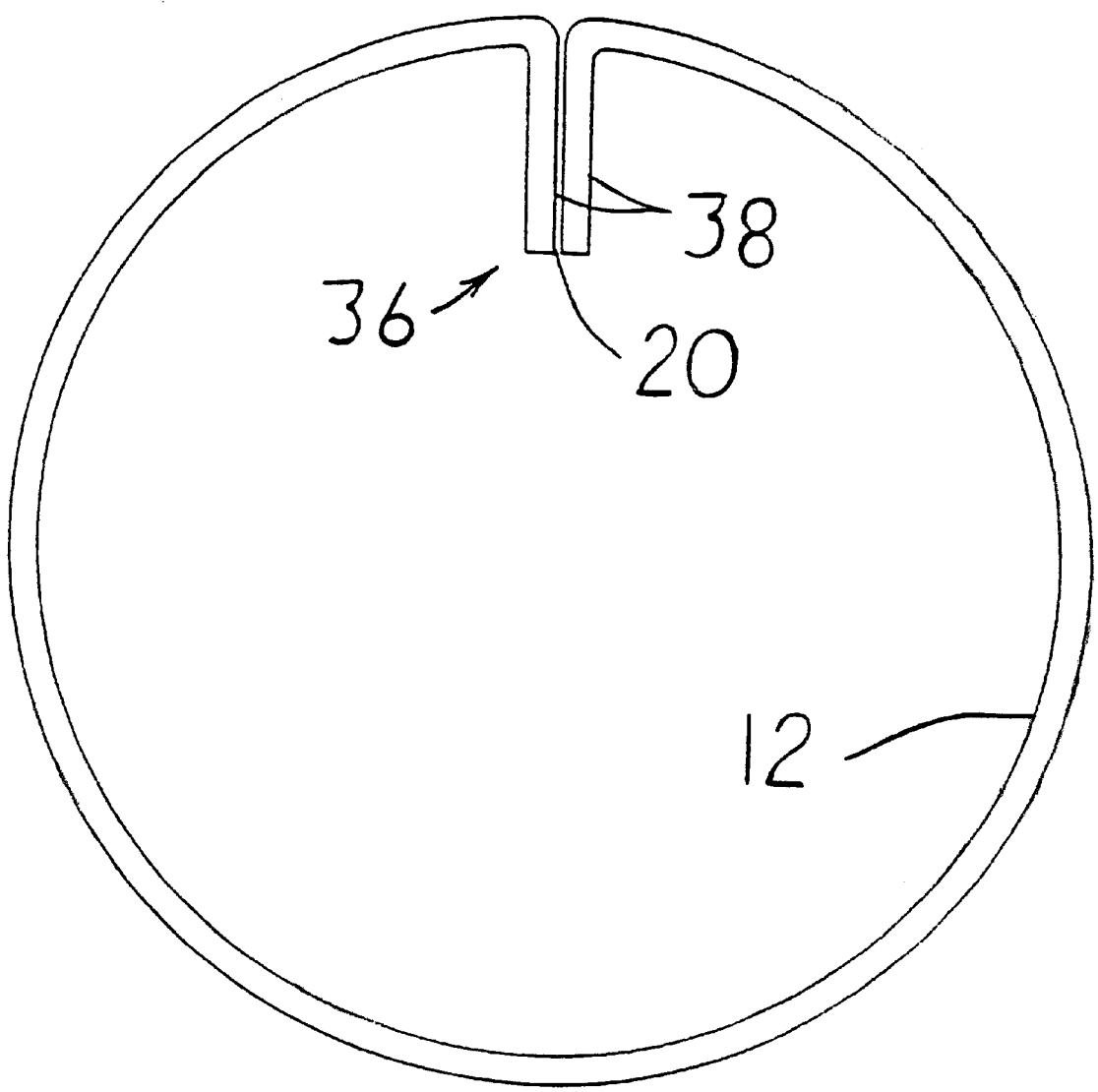
FIG. 18 provides end view of brazed channel seam tubing.
Figure 19:
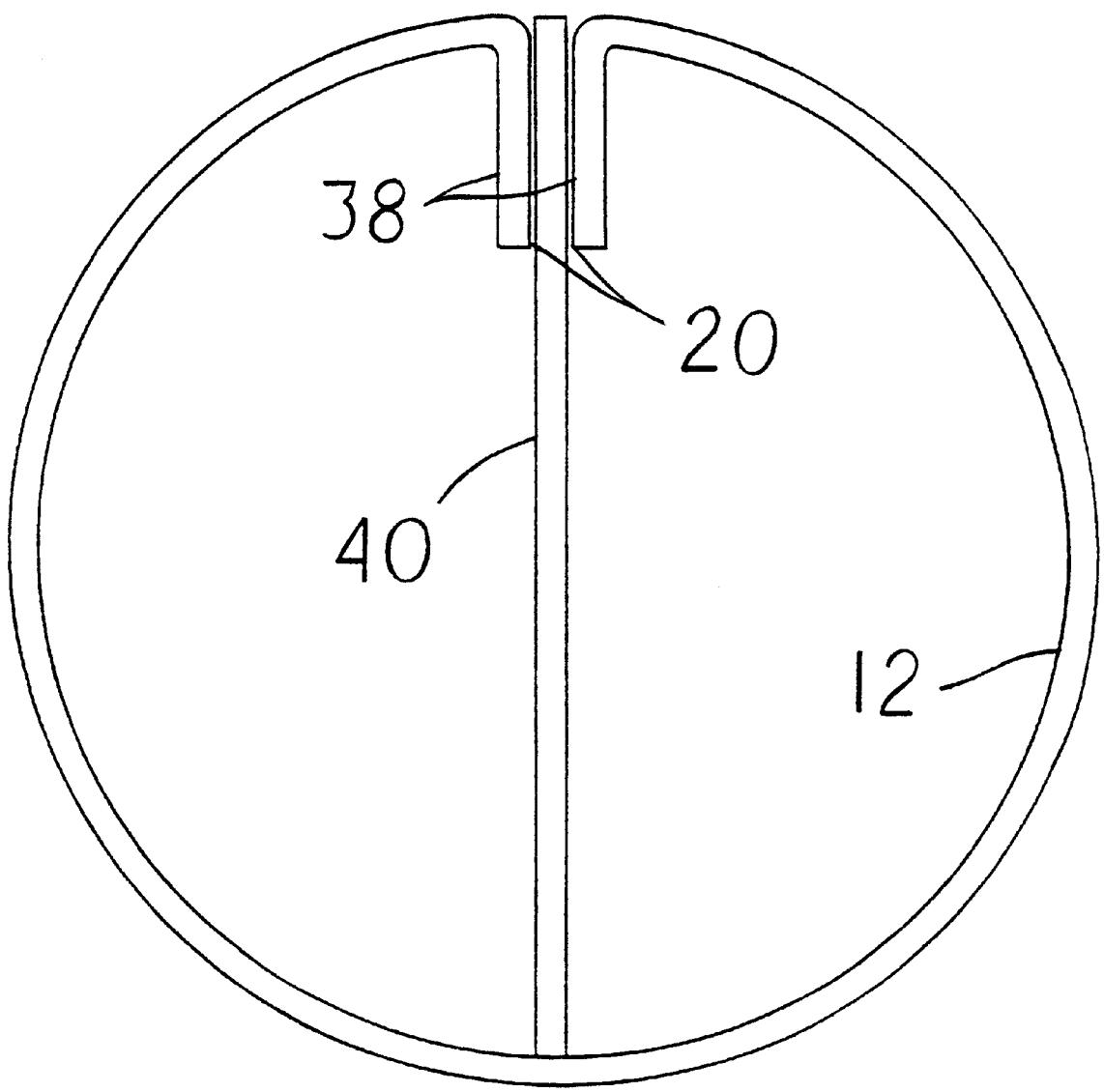
FIG. 19 provides the channel seam tubing of FIG. 18 reinforced with a solid member.

FIG. 18 provides tubing 12 of the present invention with a channel seam 38 that is brazed with a brazing material 20. Such an embodiment allows for ease in insertion of reinforcement members. For example, FIG. 19 provides the tubing 12 of FIG. 18 with a reinforcement strip 40 brazed inside the tubing. It is contemplated that the reinforcement strip 40 can be solid or can have lightening holes.

Figure 20:
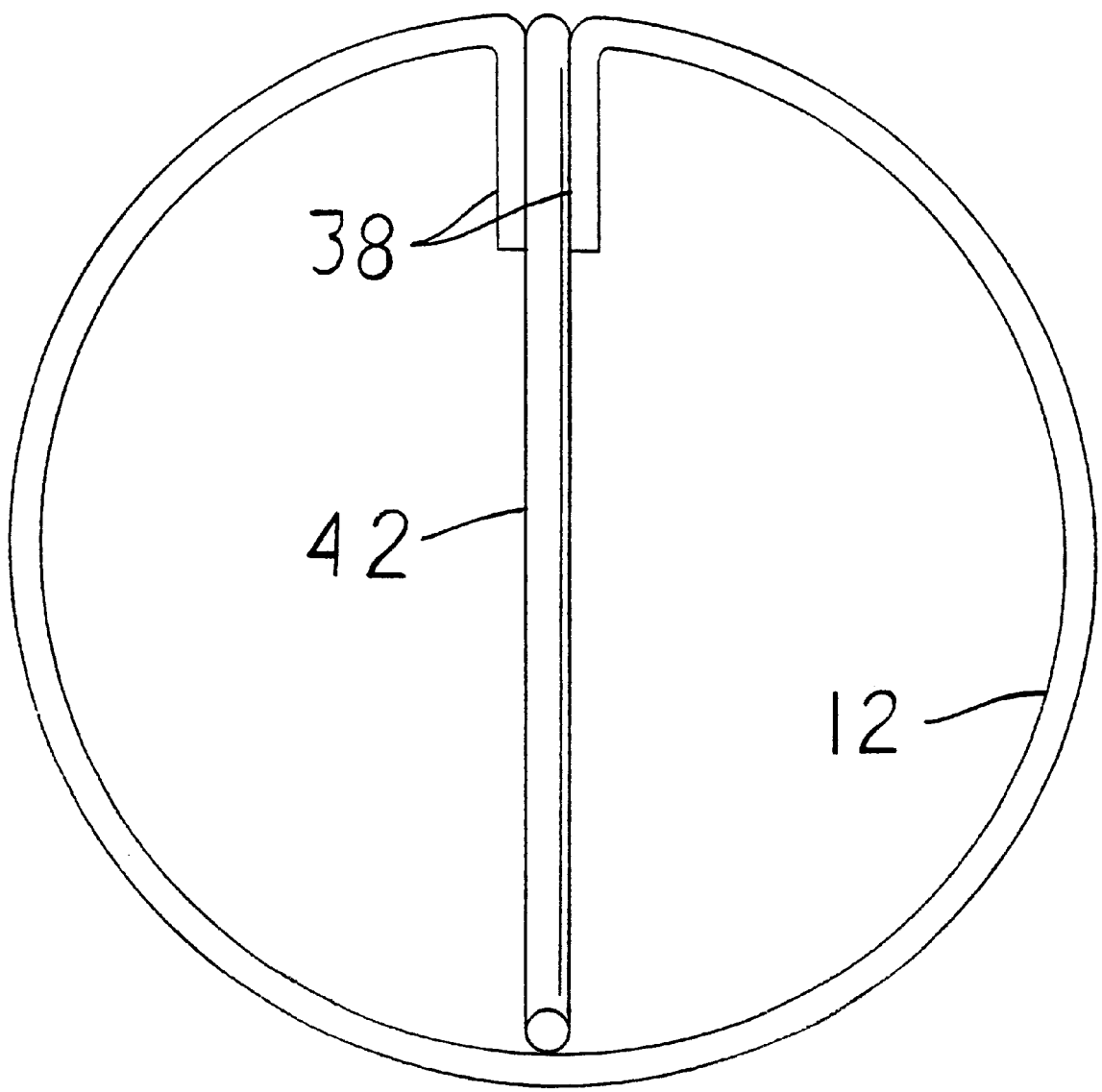
FIG. 20 provides the channel brazed tubing of FIG. 18 reinforced with a wire member.
Figure 21:
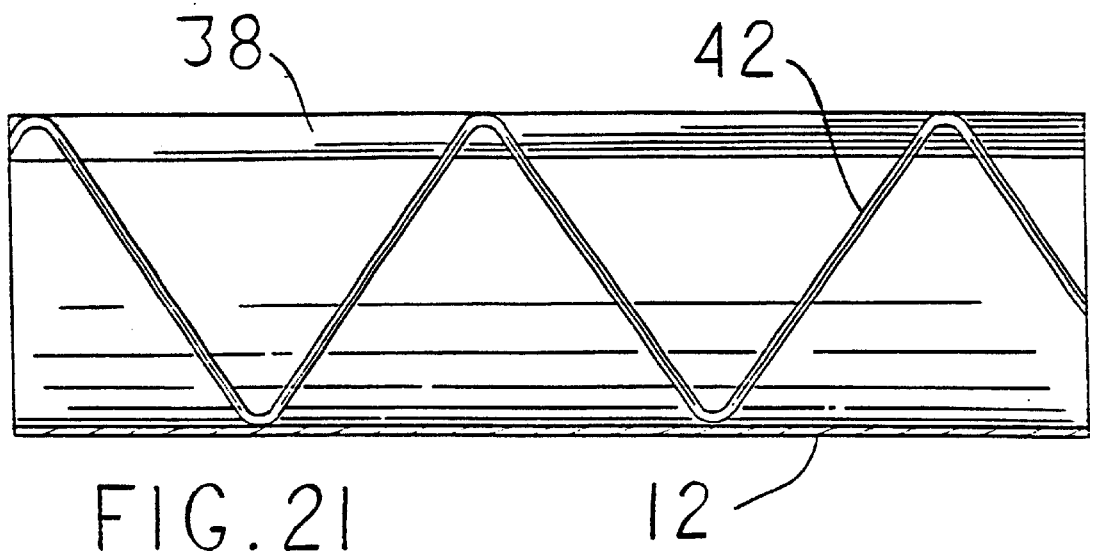
FIG. 21 provides a transparent side view of FIG. 20.
Figure 22:
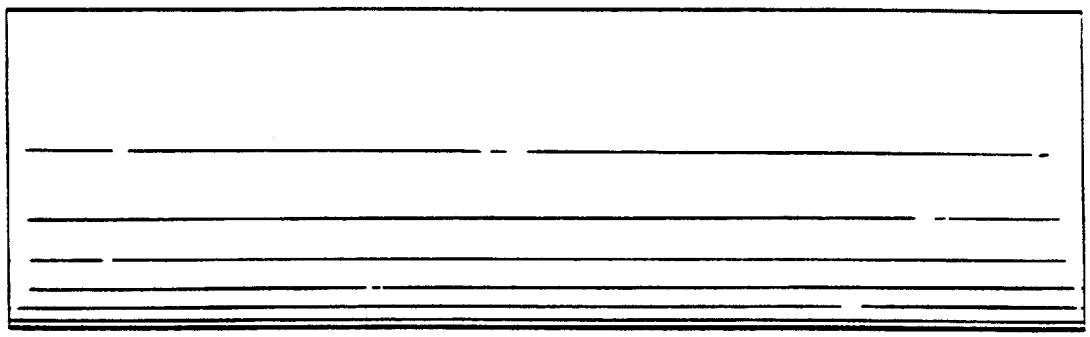
FIG. 22 provides a side view of FIG. 21.

FIG. 20 provides the tubing 12 of FIG. 18 with a reinforcement wire 42 brazed therein. FIG. 21 provides the reinforcement wire 42 in the shape of a truss. The present invention contemplates other shapes which would provide substantially equivalent support.

The present invention is not limited to any particular gauge or thickness of metal and it is contemplated that those of ordinary skill in the art would design the appropriate thicknesses of the tubing and reinforcement members used in the present invention.

What is claimed is:

1. A reinforced stainless steel shaft comprising:

an air hardened stainless steel tube;

an air hardened stainless steel reinforcement member; and brazing material proximal to the intersections of the reinforcement member with the tube, the shaft produced by the method including:
selecting an air hardenable stainless steel tubing of a predetermined diameter;
introducing within the tubing an air hardenable stainless steel reinforcement member, a portion of an external surface of which is in contact with the internal surface of the tubing,
contacting at least one confluence of the tubing and the member with a brazing material;
introducing the assembly into a controlled atmosphere furnace; and
brazing and hardening the assembly to form hardened and reinforced stainless steel tubing.

2. The shaft of claim 1, wherein the stainless steel tube has a seam.

3. The shaft of claim 1, wherein the seam is a channel seam.

4. The shaft of claim 1, wherein the reinforcement member includes a bushing.

5. The shaft of claim 4, wherein the bushing is characterized by perforations therein.

6. The shaft of claim 4, wherein the bushing is a split bushing.

7. The shaft of claim 1, wherein the reinforcement member includes a coil of stainless steel wire.

8. The shaft of claim 7, wherein the coiled wire is air hardened.

9. The shaft of claim 7, wherein the coiled wire has a variable pitch.

10. The shaft of claim 1 wherein the shaft forms a portion of a bicycle frame.

* * * * *